US008394486B2

(12) United States Patent
Hama

(10) Patent No.: US 8,394,486 B2
(45) Date of Patent: Mar. 12, 2013

(54) DECORATED SHEET

(75) Inventor: Kazuhiro Hama, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 635 days.

(21) Appl. No.: 12/443,225

(22) PCT Filed: Sep. 27, 2007

(86) PCT No.: PCT/JP2007/068783
§ 371 (c)(1), (2), (4) Date: Mar. 27, 2009

(87) PCT Pub. No.: WO2008/038703
PCT Pub. Date: Apr. 3, 2008

(65) Prior Publication Data

US 2010/0009135 A1 Jan. 14, 2010

(30) Foreign Application Priority Data

Sep. 29, 2006 (JP) ................................ 2006-269211

(51) Int. Cl.
*B32B 3/00* (2006.01)

(52) U.S. Cl. ..................... 428/172; 428/195.1; 428/206; 428/212; 428/335

(58) Field of Classification Search .................. 428/172, 428/195.1, 206, 212, 335
See application file for complete search history.

(56) References Cited

U.S. PATENT DOCUMENTS

2007/0116933 A1* 5/2007 Kobayashi et al. ........... 428/172
2010/0173132 A1* 7/2010 Furukawa ..................... 428/172

FOREIGN PATENT DOCUMENTS

| | | | |
|---|---|---|---|
| EP | 1 669 193 A1 | | 6/2006 |
| JP | 48-017537 | | 3/1973 |
| JP | 51-084910 | | 7/1976 |
| JP | 52-076115 | | 6/1977 |
| JP | 2001-260299 | | 9/2001 |
| JP | 2001-315286 | | 11/2001 |
| JP | 2001-315286 A | * | 11/2001 |
| JP | 2005-125780 A | * | 4/2005 |
| JP | 2007-111928 A | * | 5/2007 |

* cited by examiner

*Primary Examiner* — Gerard Higgins
*Assistant Examiner* — Christopher Polley
(74) *Attorney, Agent, or Firm* — Antonelli, Terry, Stout & Kraus, LLP.

(57) ABSTRACT

A decorative sheet contains a substrate having thereon at least a pattern layer, a homogeneous and uniform first surface protective layer covering the whole surface, and a second surface protective layer provided partly on the first surface protective layer. The first surface protective layer and the second surface protective layer each contain a curable resin composition having been crosslinked and cured, the first surface protective layer contains a matte agent, and the second surface protective layer contains synthetic resin beads having an average particle diameter of from 10 to 30 μm and protruding above a resin layer constituting the second surface protective layer. A region of the second surface protective layer and a region of the first surface protective layer exposed on the outermost surface have a difference in glaze, and the difference in glaze is conformed to a pattern of the pattern layer.

12 Claims, 1 Drawing Sheet

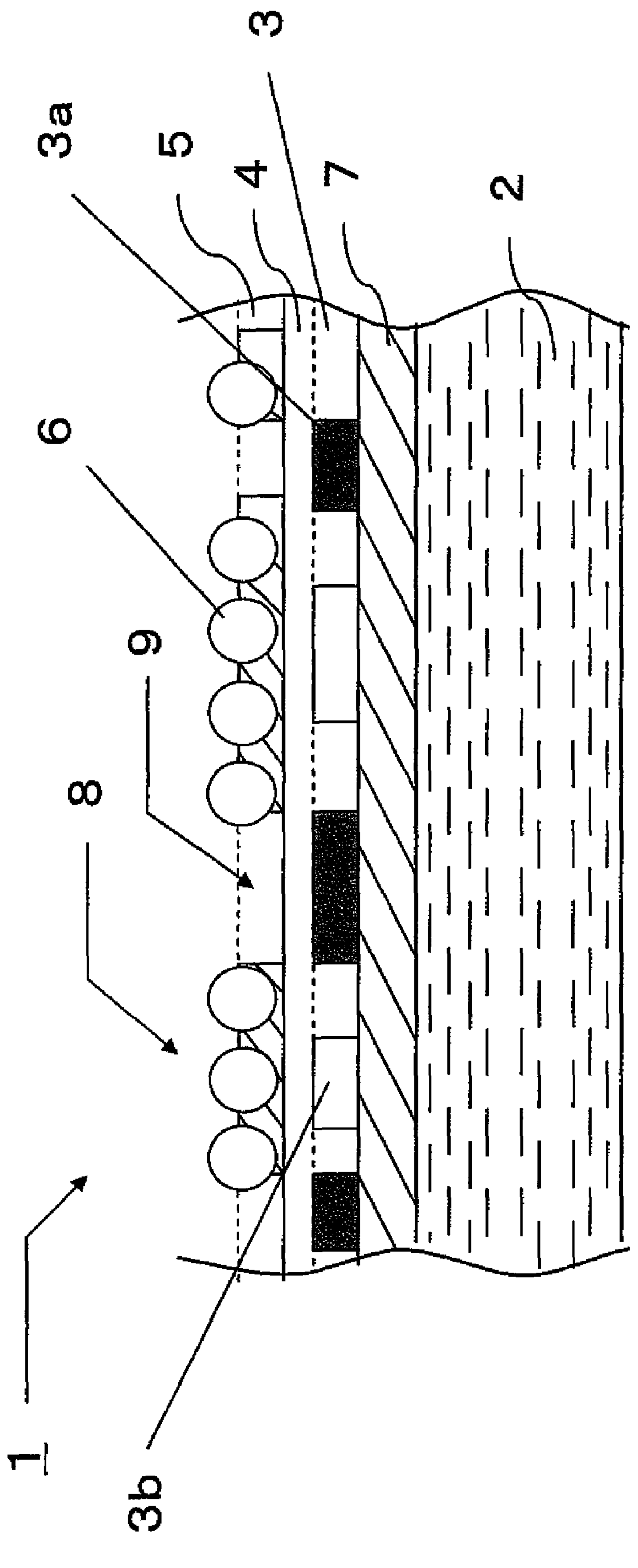
3
3a
5
4
7
2
6
9
8
1
3b

DECORATED SHEET

TECHNICAL FIELD

The present invention relates to a decorative sheet that has a pattern formed on the surface thereof, has a visually relief appearance through provision of a difference in glaze corresponding to the pattern, and has smooth and warm tactile impression of real wood (which is hereinafter referred to as "wood surface texture").

BACKGROUND ART

As a surface decorative sheet for furniture, cabinets as kitchen equipments, and the like, ones having such a structure have been used that contains a wood material, an inorganic material, a synthetic resin material, a metallic material, such as a steel plate and the like, or the like, having adhered thereto with an adhesive a decorative sheet having, for example, a woodgrain pattern printed thereon.

A sophisticated impression is being demanded for floor tiles and wall panels, and also for furniture, cabinets as kitchen equipments, and the like, according to consumers' demands for high-grade products in recent years, and a decorative panel and a decorative sheet used therefor are also demanded to have an appearance providing a sophisticated impression. Accordingly, in addition to various printing and a film having a pattern layer provided on a surface of a substrate sheet, it becomes important to provide texture and tactile impression, and various proposals have been made to provide matte or relief corresponding to particular portions of a pattern.

For example, such a method has been proposed that regions difference in wettability to an electron beam curing coating composition or a photocuring coating composition from the substrate surface are formed through a coated surface provided in a pattern form on the substrate, and then an electron beam curing coating composition or a photocuring coating composition is coated on the substrate, thereby depressing the coated surface in a region having high wettability to the coating composition, and upraising the coated surface in a region having low wettability to the coating composition (see, for example, the scope of claim in Patent Document 1). However, the method has a problem in that relief cannot be favorably formed in the case where the depressed part, i.e., the region having high wettability, is thin. Furthermore, in the case where the depressed part has a certain thickness, while a relief pattern can be provided on the substrate surface, the edge between a convex part and a concave part in the boundary region of the depressed part and the upraised part is rounded and lacks sharpness due to the surface tension of the coating composition or the like, and a convex part having a larger height than the upraised part is formed, whereby in the case, for example, of a woodgrain pattern, impression of reality is not provided, and the appearance and the hand feeling are deteriorated.

Such decorative paper having a woodgrain pattern has been proposed that thin paper is coated in solid color of wood background with an ultraviolet ray curing printing ink containing a matte agent, which is irradiated with an active light ray, and a woodgrain pattern is then printed thereon with an ultraviolet ray curing printing ink having high glaze, which is irradiated with an active light ray (see, for example, the scope of claim in Patent Document 2). According to the decorative paper, the part using the ink having high glaze appears to be a convex part, and the part using the ink containing a matte agent appears to be a concave part, thereby providing wood texture. However, the decorative paper proposed therein has no overcoated transparent film as a protective coated film, and therefore the part coated with ink for vessels for printing a woodgrain pattern is necessarily lowered in weather resistance, water resistance, wear resistance, abrasion resistance and the like, thereby deteriorating in durability.

[Patent Document 1] JP-A-48-17537

[Patent Document 2] JP-A-51-84910

DISCLOSURE OF THE INVENTION

Under the circumstances, the present invention relates to a decorative sheet that has a pattern formed on the surface thereof, has a difference in glaze, in which the difference in glaze is visually recognized as a concave part, and has a relief appearance, and the decorative sheet also has wood surface texture.

As a result of earnest investigations made by the inventors for attaining the objects, it has been found that the problems are solved in such a manner that a surface protective layer containing synthetic resin beads having a particular particle diameter is provided partly on the outermost surface of the decorative sheet, whereby a difference in glaze is exhibited by the surface protective layer, and the difference in glaze is conformed to the pattern of the pattern layer. The present invention has been completed based on the findings.

Accordingly, the present invention provides:

(1) a decorative sheet containing a substrate having thereon at least a pattern layer, a homogeneous and uniform first surface protective layer covering the whole surface, and a second surface protective layer provided partly on the first surface protective layer, the first surface protective layer and the second surface protective layer each containing a curable resin composition having been crosslinked and cured, the first surface protective layer containing a matte agent, the second surface protective layer containing synthetic resin beads having an average particle diameter of from 10 to 30 μm, the synthetic resin beads protruding above a resin layer constituting the second surface protective layer, a region of the second surface protective layer and a region of the first surface protective layer exposed on the outermost surface having a difference in glaze, and the difference in glaze being conformed to a pattern of the pattern layer, (2) the decorative sheet as described in the item (1), wherein the second surface protective layer further contains a matte agent, (3) the decorative sheet as described in the item (1) or (2), wherein the difference in glaze is measured by a method according to ASTM D523, and depending on an incident angle of light upon measurement, the region of the second surface protective layer is a high glaze region or a low glaze region, and corresponding thereto the region of the first surface protective layer exposed is a low glaze region or a high glaze region, respectively, (4) the decorative sheet as described in one of the items (1) to (3), wherein the synthetic resin beads are acrylic resin beads, (5) the decorative sheet as described in one of the items (1) to (4), wherein the curable resin composition is a thermosetting resin composition, (6) the decorative sheet as described in one of the items (1) to (4), wherein the curable resin composition is an ionizing radiation curable resin composition, (7) the decorative sheet as described in the item (6), wherein the ionizing radiation curable resin composition is an electron beam curable resin composition, (8) the decorative sheet as described in one of the items (1) to (7), wherein the pattern layer has a woodgrain pattern, and a vessel part of the woodgrain pattern is conformed to the region of the first surface protective layer exposed.

According to the present invention, such a decorative sheet can be obtained that has a pattern formed on the surface thereof, has a difference in glaze corresponding to the pattern, in which the difference in glaze is visually recognized as a concave part, and has a relief appearance on the surface thereof, and the decorative sheet also has wood surface texture to provide an appearance and hand feeling close to real wood.

BRIEF DESCRIPTION OF THE DRAWING

[FIG. 1]

The FIGURE is a schematic illustration showing a cross section of a decorative sheet according to the present invention.

DESCRIPTION OF THE SYMBOLS

| | |
|---|---|
| 1 | decorative sheet |
| 2 | substrate |
| 3 | pattern layer |
| 3a | vessel part |
| 3b | part other than vessel part |
| 4 | first surface protective layer |
| 5 | second surface protective layer |
| 6 | synthetic resin beads |
| 7 | undercoating layer |
| 8 | region of second surface protective layer |
| 9 | region of first surface protective layer exposed |

BEST MODE FOR CARRYING OUT THE INVENTION

The decorative sheet of the present invention contains a substrate having thereon at least a pattern layer, a homogeneous and uniform first surface protective layer covering the whole surface, and a second surface protective layer provided partly on the first surface protective layer.

A representative layer structure of the decorative sheet of the present invention will be described with reference to FIG. 1. FIG. 1 is a schematic illustration showing a cross section of a decorative sheet 1 according to the present invention. In the example shown in FIG. 1, a homogeneous and uniform undercoating layer 7 that covers the whole surface and is provided depending on necessity, a pattern layer 3, a homogeneous and uniform first surface protective layer 4 that covers the whole surface, and a second surface protective layer 5 that is provided partly are formed in this order on a substrate 2. The second surface protective layer 5 contains synthetic resin beads 6, which protrude above the resin layer constituting the second surface protective layer. On the outermost surface of the decorative sheet of the present invention, the region of the second surface protective layer 8 and the region of the first surface protective layer exposed 9 have an appropriate difference in glaze, hand feeling is provided on the whole surface, and the difference in glaze is conformed to the pattern of the pattern layer 3.

The components constituting the layers will be described in detail below with reference to FIG. 1.

The substrate 2 used in the present invention is not particularly limited as far as it is one that is generally used as a substrate of a decorative sheet, and may be arbitrarily selected from various kinds of paper, a plastic film, a plastic sheet, a metallic foil, a metallic sheet, a metallic plate, a woody plate, such as wood and the like, a ceramic material and the like. The materials may be used solely or may be a laminated material of an arbitrary combination thereof, such as a composite material of paper, a composite material of paper and a plastic film, and the like.

In the case of using the substrate, particularly a plastic film or a plastic sheet as the substrate, a physical or chemical surface treatment, such as an oxidizing method, a roughening method and the like, may be performed on one surface or both surfaces depending on necessity for enhancing the adhesiveness to a layer provided thereon.

Examples of the oxidizing method include a corona discharge treatment, a chromium oxidation treatment, a flame treatment, a hot air treatment, an ozone or ultraviolet ray treatment and the like, and examples of the roughening method include a sandblasting method, a solvent treatment and the like. The surface treatment may be appropriately selected depending the kind of the substrate, and in general, a corona discharge treatment is preferably used from the standpoint of effects, operability and the like.

The substrate may also be subjected to a treatment of providing a primer layer or the like, and may be provided with coating for controlling the color or with a pattern from the standpoint of design.

Examples of the various kinds of paper used as the substrate include thin paper, craft paper, titania paper and the like. The paper substrate may be reinforced among the fibers of the paper substrate or between another layer and the paper substrate, or may contain (impregnated after making paper or internally filled upon making paper) such a resin as an acrylic resin, styrene-butadiene rubber, a melamine resin, a urethane resin and the like, for preventing fuzz. For example, interlayer reinforced paper, resin-impregnated paper and the like may be used.

In addition to these, examples thereof include various kinds of paper that are often used in the field of building materials, such as linter paper, paper board, base paper for plasterboard, raw paper for resin-coated wallpaper having a vinyl chloride resin layer coated on paper, and the like. Furthermore, such paper may also be used that is used in offices and ordinary printing, packaging and the like, such as coated paper, art paper, sulfate paper, glassine paper, parchment paper, paraffin paper, Japanese paper and the like. While being distinguished from these kinds of paper, a woven cloth and a nonwoven cloth of various fibers having appearance and properties that are similar to paper may also be used as the substrate. Examples of the various fibers include inorganic fibers, such as glass fibers, asbestos fibers, potassium titanate fibers, alumina fibers, silica fibers, carbon fibers and the like, and synthetic resin fibers, such as polyester fibers, acrylic fibers, vinylon fibers and the like.

Examples of the plastic film or the plastic sheet include those formed of various kinds of synthetic resins. Examples of the synthetic resin include a polyethylene resin, a polypropylene resin, a polymethylpentene resin, a polyvinyl chloride resin, a polyvinylidene chloride resin, a polyvinyl alcohol resin, a vinyl chloride-vinyl acetate copolymer resin, an ethylene-vinyl acetate copolymer resin, an ethylene-vinyl alcohol copolymer resin, a polyethylene terephthalate resin, a polybutylene terephthalate resin, a polyethylene naphthalate-isophthalate copolymer resin, a polymethyl methacrylate resin, a polyethyl methacrylate resin, a polybutyl acrylate resin, a polyamide resin, represented by nylon 6, nylon 66 or the like, a cellulose triacetate resin, cellophane, a polystyrene resin, a polycarbonate resin, a polyarylate resin, a polyimide resin and the like.

Examples of the metallic foil, the metallic sheet and the metallic plate include those formed, for example, of aluminum, iron, stainless steel, copper or the like. These materials having metallic plating may also be used. Examples of the wood material include a single panel, a laminated board, a bonded board, a particle board, a wood fiber board, such as MDF (medium density fiber) board and the like, of wood. Examples of the ceramic material include a ceramic building material, such as a plasterboard, a calcium silicate board, a wood chip cement board and the like, pottery, glass, porcelain enamel, burnt tile and the like. In addition to these, such a composite material of various materials, such as a board of fiber-reinforced plastics (FRP), a board obtained by adhering iron plates to both surfaces of a paper honeycomb board, a board obtained by holding a polyethylene resin with two aluminum plates, and the like, may also be used as the substrate.

While the thickness of the substrate 2 is not particularly limited, the thickness is generally about from 20 to 150 μm and preferably, from 30 to 100 μm for the case using a sheet containing plastics as a raw material, and the basis weight is generally about from 20 to 150 g/m$^2$, and preferably from 30 to 100 g/m$^2$, for the case using a paper substrate.

The homogeneous and uniform undercoating layer 7 covering the whole surface as shown in FIG. 1 is provided depending on necessity for enhancing the design property of the decorative sheet of the present invention. This may also be referred to as a hiding layer or a full-surface solid layer. The undercoating layer 7 is provided depending on necessity when the substrate 2 is colored or has color heterogeneity by itself for fixing up the color on the surface of the substrate 2, thereby providing intended color on the surface of the substrate 2. In general, the layer is often formed in opaque color, but there are cases where the layer is formed in transparent color to utilize the background pattern. The undercoating layer 7 may not be formed in the case where the white color of the substrate 2 is utilized, or the substrate 2 itself is suitably colored.

Examples of an ink for forming the undercoating layer include those containing a binder mixed with a colorant, such as a pigment, a dye and the like, a body pigment, a solvent, a stabilizer, a plasticizer, a catalyst, a curing agent and the like. The binder is not particularly limited, and examples thereof include a polyurethane resin, a vinyl chloride-vinyl acetate copolymer resin, a vinyl chloride-vinyl acetate-acrylate copolymer resin, a chlorinated polypropylene resin, an acrylic resin, a polyester resin, a polyamide resin, a butyral resin, a polystyrene resin, a nitrocellulose resin, a cellulose acetate resin and the like, arbitrary ones of which may be used solely or as a mixture of two or more of them.

Examples of the colorant include an inorganic pigment, such as carbon black (Japanese black), iron black, titanium white, antimony white, lead yellow, titanium yellow, red iron oxide, cadmium red, ultramarine blue, cobalt blue and the like, an organic pigment or dye, such as quinacridone red, isoindolinone yellow, phthalocyanine blue and the like, a metallic pigment formed of scale-like flakes of aluminum, brass or the like, a pearlescent pigment formed of scale-like flakes of titanium dioxide-coated mica, basic lead carbonate or the like, and the like.

As the undercoating layer 7, a so-called solid printed layer having a thickness of about from 1 to 20 μm is preferably used.

The pattern layer 3 shown in FIG. 1 is to impart decoration to the substrate 2 and is formed by printing various patterns with an ink and a printer. Examples of the pattern include a woodgrain pattern, a stone grain pattern, such as a marble pattern (for example, a travertine marble pattern) and the like, a cloth pattern imitating a cloth texture or a pattern of cloth, a tiled pattern, a brick pattern and the like, and also include patterns of parquetry, patchwork or the like, formed by combining the patterns. The pattern is generally formed by multicolor printing with process colors including yellow, red, blue and black, and may also be formed by multicolor printing with special colors that is performed by using plates for the respective colors constituting the pattern.

Examples of the pattern ink used in the pattern layer 3 include the same ones as in the ink used in the undercoating layer 7.

The first surface protective layer 4 and the second surface protective layer 5 are each constituted by a curable resin composition having been crosslinked and cured. Examples of the curable resin composition include a thermosetting resin composition, an ionizing radiation curable resin composition and the like.

Examples of a thermosetting resin used in the thermosetting resin composition include thermosetting resins, such as a polyester resin, an epoxy resin, a polyurethane resin, an aminoalkyd resin, a melamine resin, a guanamine resin, a urea resin, a thermosetting acrylic resin and the like. Among these, a polyurethane resin is preferably used. The polyurethane resin referred herein is a resin containing a polyol (polyhydric alcohol) as a main component and an isocyanate as a crosslinking agent (curing agent).

The polyol is a compound having two or more hydroxyl groups in one molecule, and examples thereof include polyethylene glycol, polypropylene glycol, acrylic polyol, polyester polyol, polyether polyol, alkyd-modified acrylic polyol and the like. Among these, alkyd-modified acrylic polyol is preferred.

As the isocyanate, a polyvalent isocyanate having two or more isocyanate groups in one molecule is used. Examples thereof include an aromatic isocyanate, such as 2,4-tolyelenediisocyanate, xylenediisocyanate, 4,4-diphenylmethanediisocyanate and the like, an aliphatic isocyanate, such as hexamethylenediisocyanate, isophoronediisocyanate, hydrogenated tolylenediisocyanate, hydrogenated diphenylmethanediisocyanate and the like, and the like.

The ionizing radiation curable resin composition in the present invention means such a resin composition that is crosslinked and cured through irradiation of a radiation having an energy quantum capable of crosslinking and curing the molecules, i.e., an ultraviolet ray, an electron beam or the like, among electromagnetic waves and charged particle radiations. Specifically, ones appropriately selected from polymerizable monomers, polymerizable oligomers and prepolymers that have been ordinarily used as an ionizing radiation curable resin composition may be used.

Representatively, a (meth)acrylate monomer having a radical polymerizable unsaturated group in the molecule is preferred as the polymerizable monomer, and in particular, a polyfunctional (meth)acrylate is preferred. The term "(meth) acrylate" herein means "acrylate or methacrylate". The polyfunctional (meth)acrylate may be a (meth)acrylate that has two or more ethylenic unsaturated bonds in the molecule without particular limitation. Specific examples thereof include ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, neopentyl glycol hydroxypivalate di(meth)acrylate, dicyclopentanyl di(meth) acrylate, caprolactone-modified dicyclopentenyl di(meth) acrylate, ethylene oxide-modified phosphoric acid di(meth) acrylate, allylated cyclohexyl di(meth)acrylate, isocyanurate di(meth)acrylate, trimethylolpropane tri(meth)acrylate, ethylene oxide-modified trimethylolpropane tri(meth)acrylate, dipentaerythritol tri(meth)acrylate, propionic acid-modified dipentaerythritol tri(meth)acrylate, pentaerythritol tri(meth) acrylate, propylene oxide-modified trimethylolpropane tri (meth)acrylate, tris(acryloxyethyl) isocyanurate, propionic acid-modified dipentaerythritol penta(meth)acrylate, dipentaerythritol hexa(meth)acrylate, ethylene oxide-modified dipentaerythritol hexa(meth)acrylate, caprolactone-modified dipentaerythritol hexa(meth)acrylate and the like. These polyfunctional (meth)acrylates may be used solely or as a mixture of two or more of them.

In the present invention, a monofunctional (meth)acrylate may be used along with the polyfunctional (meth)acrylate for such purposes as decreasing the viscosity thereof or the like in such a range that does not impair the advantages of the present invention. Examples of the monofunctional (meth)acrylate include methyl(meth)acrylate, ethyl(meth)acrylate, propyl (meth)acrylate, butyl(meth)acrylate, pentyl(meth)acrylate, hexyl(meth)acrylate, cyclohexyl(meth)acrylate, 2-ethylhexyl(meth)acrylate, lauryl(meth)acrylate, stearyl(meth) acrylate, isobornyl(meth)acrylate and the like. These monofunctional (meth)acrylates may be used solely or as a mixture of two or more of them.

Examples of the polymerizable oligomer include oligomers that contain a radical polymerizable unsaturated group in the molecule, such as an epoxy(meth)acrylate series, a urethane(meth)acrylate series, a polyester(meth)acrylate series, a polyether(meth)acrylate series and the like. The epoxy(meth)acrylate oligomer may be obtained, for example, by reacting an oxirane ring of a bisphenol type epoxy resin or novolak type epoxy resin having a relatively low molecular weight with (meth)acrylic acid for esterification. A carboxyl-modified epoxy(meth)acrylate oligomer obtained by modifying partly the epoxy(meth)acrylate oligomer with a dibasic carboxylic anhydride may also be used. The urethane(meth) acrylate oligomer can be obtained, for example, by esterifying a polyurethane oligomer, which is formed by reacting a polyether polyol or a polyester polyol with a polyisocyanate, with (meth)acrylic acid. The polyester(meth)acrylate oligomer can be obtained, for example, by esterifying hydroxyl groups of a polyester oligomer having hydroxyl groups at both ends, which is formed by condensation of a polybasic carboxylic acid and a polyhydric alcohol, with (meth)acrylic acid, or by esterifying hydroxyl groups at ends of an oligomer, which is formed by adding an alkylene oxide to a polybasic carboxylic acid, with (meth)acrylic acid. The polyether (meth)acrylate oligomer can be obtained by esterifying hydroxyl groups of a polyether polyol with (meth)acrylic acid.

Examples of the polymerizable oligomer further include a highly hydrophobic polybutadiene(meth)acrylate oligomer having a (meth)acrylate group on a side chain of polybutadiene oligomer, a silicone(meth)acrylate oligomer having a polysiloxane bond on the main chain, an aminoplast resin (meth)acrylate oligomer formed by modifying an aminoplast resin having a large amount of reactive groups in a small molecule, a novolak type epoxy resin, a bisphenol type epoxy resin, an oligomer having a cationic polymerizable functional group in the molecule, such as an aliphatic vinyl ether, an aromatic vinyl ether and the like, and the like.

In the case where an ultraviolet ray curable resin composition is used as the ionizing radiation curable resin composition, a photopolymerization initiator is preferably added in an amount of about from 0.1 to 5 parts by mass per 100 parts by mass of the resin composition. The photopolymerization initiator may be selected from those having been ordinarily used without limitation, and examples thereof for the polymerizable monomer or polymerizable oligomer having a radical polymerizable unsaturated group in the molecule include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholinopropan-1-one, 4-(2-hdyroxyethoxy)phenyl 2-(hydroxy-2-propyl) ketone, benzophenone, p-phenylbenzophenone, 4,4'-diethylaminobenzophenone, dicyclobenzophenone, 2-methylanthraquinone, 2-ethylanthraquinone, 2-tert-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenonedimethylketal and the like.

Examples thereof for the polymerizable oligomer having a cationic polymerizable functional group in the molecule or the like include an aromatic sulfonate salt, an aromatic diazonium salt, an aromatic iodonium salt, a metallocene compound, a benzoin sulfonate ester and the like.

Examples of a photosensitizer include a p-dimethylbenzoate ester, a tertiary amine compound, a thiol sensitizer and the like.

In the present invention, an electron beam curable resin composition is preferably used as the ionizing radiation curable resin composition. This is because the electron beam curable resin composition can be used with no solvent, which is more preferred from the standpoint of environment and health, and stable curing characteristics can be obtained without a photopolymerization initiator.

The thickness of the first surface protective layer 4 and the second surface protective layer 5 is not particularly limited, and in general, they are appropriately designed within a range of from 3 to 10 μm. The coating method therefor includes gravure coating, bar coating, roll coating, reverse roll coating, comma coating and the like, and gravure coating is most commonly used.

In the decorative sheet of the present invention, the second surface protective layer 5 is provided partly on the first surface protective layer 4, and the first surface protective layer contains a matte agent. Examples of the matte agent include an inorganic salt, such as calcium carbonate, barium sulfate, calcium silicate and the like, and inorganic powder, such as talk and the like, and the average particle diameter of the matte agent is generally in a range of from 0.1 to 5 μm. The amount of the matte agent added may be appropriately determined depending on the extent of the demanded matte appearance of the decorative sheet, and is generally in a range of from 1 to 30% by mass (in terms of solid content) based on the resin composition constituting the surface protective layer.

The second surface protective layer 5 may contain a matte agent, and the addition of a matte agent enables fine control of the difference in glaze between the region of the second surface protective layer 8 and the region of the first surface protective layer exposed 9 on the outermost surface of the decorative sheet, as described in detail later. As the matte agent used in the second surface protective layer 5, the similar ones as used in the first surface protective layer may be used.

In the decorative sheet of the present invention, the second surface protective layer 5 contains synthetic resin beads 6 having an average particle diameter of from 10 to 30 μm. The synthetic resin beads 6 protrude above the resin layer constituting the second surface protective layer 5, thereby producing wood surface texture. Accordingly, it is necessary to determine the average particle diameter of the synthetic resin beads 6 in consideration of the relationship to the thickness of the second surface protective layer 5, and at least, when the average particle diameter of the synthetic resin beads 6 is less than 10 μm, it is difficult to obtain hand feeling of wood surface texture since the part of the synthetic resin beads 6 that is embedded in the coated film is increased. When the average particle diameter of the synthetic resin beads 6 exceeds 30 μm, on the other hand, the synthetic resin beads 6 are liable to be dropped off from the second surface protective layer 5, thereby deteriorating the damage resistance of the decorative sheet. Taking the viewpoints in consideration, the average particle diameter of the synthetic resin beads 6 is preferably in a range of from 15 to 25 μm.

The kind of the synthetic resin beads 6 is not particularly limited, examples of which include acrylic resin beads, styrene resin beads, urethane resin beads, polyester resin beads and the like, and acrylic resin beads having high transparency, such as urethane acrylic resin beads and the like, are preferred in consideration of design effect owing to the difference in glaze between the first surface protective layer 4 and the second surface protective layer 5.

The amount of the synthetic resin beads 6 added is preferably in a range of from 10 to 50% by mass (in terms of solid content) based on the resin composition for constituting the second surface protective layer 5 from the standpoint of provision of optimum wood surface texture.

The decorative sheet of the present invention has a difference in glaze between the region of the second surface protective layer 8 and the region of the first surface protective layer exposed 9 on the outermost surface thereof. The difference in glaze is formed since the first surface protective layer 4 contains a matte agent and the second surface protective layer 5 does not contain a matte agent. The second surface protective layer 5 contains synthetic resin beads as described above, and thereby a certain extent of matte effect is imparted to the second surface protective layer 5, so as to provide a difference in glaze that is further close to real wood. This will be described in detail below.

The difference in glaze is obtained by subtracting the glossiness of the region having relatively low glaze from the glossiness of the region having relatively high glaze, and the glossiness is measured by a method according to ASTM D523. In the decorative sheet of the present invention, the region of the second surface protective layer 8 is the region having relatively high glaze or the region having relatively low glaze, and corresponding thereto the region of the first surface protective layer exposed 9 is the region having relatively low glaze or the region having relatively high glaze, respectively, depending on the incident angle of light upon measurement, thereby exhibiting the difference in glaze.

With respect to the difference in glaze, the difference in glaze of real wood pattern varies depending on the viewing angle. Specifically, the vessel part has low glaze with a light incident angle of from 0 to about 80 degrees and exhibits high glaze with a light incident angle of from about 80 to 90 degrees. Since real wood exhibits inversion of difference in glaze depending on the viewing angle, an appearance further close to real wood can be obtained when the inversion of difference in glaze depending on the angle can be effectively exhibited.

A conventional decorative sheet employs such a structure that the first surface protective layer 4 contains a matte agent and the second surface protective layer 5 does not contain a matte agent, and the first surface protective layer 4 exhibits low glaze with the second surface protective layer 5 exhibiting high glaze. In the conventional decorative sheet, the inversion of difference in glaze due to the viewing angle is not exhibited. Furthermore, there is a case where a matte agent is added also to the second surface protective layer for controlling the difference in glaze, and in this case, the above-described inversion of difference in glaze may occur. However, the extent of the inversion is small, and the difference in glaze is difficult to control.

In a preferred embodiment of the decorative sheet of the present invention, on the other hand, the first surface protective layer contains a matte agent, and the second surface protective layer contains the synthetic resin beads and additionally also contains a matte agent. Owing to the structure, the above-described change of difference in glaze due to the viewing angle is effectively generated and controlled. Specifically, the difference in glaze between the high glaze region and the low glaze region can be controlled by changing the kind (such as the material, the average particle diameter and the like) and the content of the matte agent, and the kind, the particle diameter, the content and the like of the synthetic resin beads, thereby expressing delicate design.

In the decorative sheet of the present invention, furthermore, the difference in glaze and the pattern of the pattern layer are conformed to each other, and hand feeling is provided by adding the synthetic resin beads. Accordingly, in the case where the structure of the present invention is applied to a woodgrain pattern, and the difference in glaze and the vessel part of the woodgrain pattern are conformed to each other, the glaze of the vessel part is viewed as a convex part or viewed as a concave part depending on the viewing angle owing to the change in glaze, and combined therewith the hand feeling is provided, whereby the decorative sheet of the present invention provides texture similar to real woodgrain patterns (wood surface texture), thereby attaining considerably high design property.

The curable resin composition constituting the surface protective layers 4 and 5 in the present invention may contain various additives depending on the intended properties of the resulting cured resin layers. Examples of the additive include a weather resistance improving agent, a wear resistance improving agent, a polymerization inhibitor, a crosslinking agent, an infrared ray absorbent, an antistatic agent, an adhesion improving agent, a leveling agent, a thixotropy imparting agent, a coupling agent, a plasticizer, a defoaming agent, a filler, a solvent, a colorant and the like.

As the weather resistance improving agent, an ultraviolet ray absorbent and a light stabilizer may be used. The ultraviolet absorbent may be an inorganic series or an organic series, and preferred examples of the inorganic ultraviolet ray absorbent include titanium dioxide, cerium oxide, zinc oxide and the like having an average particle diameter of about from 5 to 120 nm. Examples of the organic ultraviolet ray absorbent include a benzotriazole series, specifically 2-(2-hydroxy-5-methylphenyl)benzotriazole, 2-(2-hydroxy-3,5-di-tert-amylphenyl)benzotriazole, polyethylene glycol 3-(3-(benzotriazol-2-yl)-5-tert-butyl-4-hydroxyphenyl)-propionate and the like. Examples of the light stabilizer include a hindered amine series, specifically bis(1,2,2,6,6-pentamethyl-4-piperidyl) 2-(3,5-di-tert-butyl-4-hydroxy-benzyl)-2'-n-butylmalonate, bis(1,2,2,6,6-pentamethyl-4-piperidyl)sebacate, tetrakis(2,2,6,6-tetramethyl-4-piperidyl)1,2,3,4-butanetetracarboxylate and the like. Furthermore, as the ultraviolet ray absorbent and the light stabilizer, a reactive ultraviolet ray absorbent or light stabilizer having a polymerizable group, such as a (meth)acryloyl group and the like, in the molecule may be used.

Examples of the wear resistance improving agent include an inorganic material, such as α-alumina, silica, kaolinite, iron oxide, diamond, silicon carbide and the like. Examples of the shape of particles include a sphere, an ellipsoid, a polyhedron, a flake and the like, and a sphere is preferred while not limited particularly. Examples thereof also include an organic material including synthetic resin beads, such as a crosslinked acrylic resin, a polycarbonate resin and the like. The particle diameter thereof is generally about from 30 to 200% of the film thickness. Among these, spherical α-alumina is particularly preferred since it has high hardness, exhibits large effect of improving the wear resistance, and can be relatively easily obtained in the form of spherical particles.

Examples of the polymerization inhibitor include hydroquinone, p-benzoquinone, hydroquinone monomethyl ether, pyrogallol, t-butylcatechol and the like, and examples of the crosslinking agent include a polyisocyanate compound, an epoxy compound, a metal chelate compound, an aziridine compound, an oxazoline compound and the like.

Examples of the filler include barium sulfate, talc, clay, calcium carbonate, aluminum hydroxide and the like.

Examples of the colorant include known pigments for coloring, such as quinacridone red, isoindolinone yellow, phthalocyanine blue, phthalocyanine green, titanium oxide, carbon black and the like.

Examples of the infrared ray absorbent include a dithiol metallic complex, a phthalocyanine compound, a dimmonium compound and the like.

In the present invention, the polymerizable monomer or the polymerizable oligomer as the curing component and the various additives are mixed homogeneously at prescribed ratios to prepare a coating composition containing the curable resin composition. The viscosity of the coating composition is not particularly limited and may be such a viscosity that an uncured resin layer can be formed on the surface of the substrate.

In the present invention, the coating composition thus prepared is coated on the surface of the substrate to make a thickness of from 3 to 10 μm after curing by a known method, such as gravure coating, bar coating, roll coating, reverse roll coating, comma coating and the like, preferably gravure coating, to form an uncured resin layer.

In the present invention, the uncured resin layer thus formed is heated or irradiated with an ionizing radiation, such as an electron beam, an ultraviolet ray and the like, whereby the uncured resin layer is cured.

In the case of heat curing, the heating temperature is appropriately determined depending on the resin used. In the case where an electron beam is used as the ionizing radiation, the acceleration voltage thereof may be appropriately determined depending on the resin used and the thickness of the layer, and in general, it is preferred to cure the uncured resin layer with an acceleration voltage of about from 70 to 300 kV.

Upon irradiation of an electron beam, the penetration capability thereof is increased with a higher acceleration voltage. Accordingly, in the case where a material that is deteriorated with an electron beam is used as the substrate, the acceleration voltage is selected in such a manner that the penetration depth of the electron beam is substantially the same as the thickness of the resin layer, whereby the substrate can be prevented from being irradiated excessively with the electron beam, and deterioration of the substrate due to an excessive electron beam can be minimized.

The exposure dose is preferably such a value that saturates the crosslinking density of the resin layer, and is generally selected from a range of from 5 to 300 kGy (from 0.5 to 30 Mrad), and preferably from 10 to 50 kGy (from 1 to 5 Mrad).

The electron beam source is not particularly limited, and examples thereof include a Cockroft-Walton type, a Van de Graaff type, a resonance transformer type, an insulating core transformer type, and various kinds of electron beam accelerators, such as a linear type, a dynamitron type, a high frequency type and the like.

In the case where an ultraviolet ray is used as the ionizing radiation, an ultraviolet ray containing that having a wavelength of from 190 to 380 nm is radiated. The ultraviolet ray source is not particularly limited, and examples thereof include a high-pressure mercury lamp, a low-pressure mercury lamp, a metal halide lamp, a carbon arc lamp and the like.

The cured resin layer thus formed may contain various kinds of additives to impart various functions, such as a hardcoat function providing high hardness for abrasion resistance, an antifogging coating function, an antifouling coating, an antidazzle coating function, an antireflection coating function, an ultraviolet ray shield coating function, an infrared ray shield coating function and the like.

EXAMPLE

The present invention will be described in more detail with reference to examples below, but the invention is not limited to the examples.

(Evaluation Methods)

The decorative sheets obtained in the examples were evaluated in the following manners.

(1) Evaluation of Glossiness

The glossiness was measured with "Model VG-2000", produced by Nippon Denshoku Industries Co., Ltd., according to ASTM D523 at an incident angle of 20 degrees, 60 degrees and 85 degrees.

(2) Hand Feeling (Sensory Evaluation)

The surfaces of the decorative sheets obtained in the examples and the comparative examples were each touched with the hand and evaluated as to whether wood surface texture was obtained with strong resistance or wood surface texture was not obtained with weak resistance.

Example 1

Interlayer reinforced paper for building having a basis weight of 30 g/m$^2$ was used as a substrate 2, and on one surface thereof, an ink containing an acrylic resin and nitrocellulose as a binder and titanium white, red iron oxide and lead yellow as a colorant was coated by gravure printing to form a (full-surface solid) layer having a coated amount of 5 g/m$^2$ as an undercoating layer 7. An ink containing nitrocellulose as a binder and red iron oxide as a major component of a colorant was coated thereon by gravure printing to form a pattern layer 3 having a woodgrain pattern.

A thermosetting resin composition, which was obtained by dissolving or dispersing 55% by mass of a urethane resin ("UC", produced by DIC Corporation) formed of an acrylic polyol and an isocyanate and 22.5% by mass of silica particles having an average particle diameter of about 2 μm in ethyl acetate (solvent), was then coated on the pattern layer 3 by a gravure offset coater method to a coated amount of 5 g/m$^2$ to provide a resin layer for a first surface protective layer.

A thermosetting resin composition for forming a second surface protective layer was prepared by dissolving or dispersing 55% by mass of the same thermosetting resin as used for the first surface protective layer and 26% by mass of urethane acrylic beads having an average particle diameter of 17 μm in ethyl acetate (solvent). The composition was coated by gravure printing to conform to the part other than the vessel part of the woodgrain pattern of the pattern layer 3 to provide a resin layer 5 for a second surface protective layer. In other words, the resin for forming the second surface protective layer is printed on the other part than the vessel part of the woodgrain pattern, whereby the region of the first surface protective layer exposed 9 is positionally conformed to the vessel part of the woodgrain pattern.

After coating, the layers were heated to 120° C. to cure the thermosetting resin compositions, thereby forming the first surface protective layer 4 and the second surface protective layer 5. Subsequently, they were aged at 70° C. for 24 hours to provide a decorative sheet. The thickness of the first surface protective layer 4 was about 3.5 μm, and the thickness of the second surface protective layer was about 6 μm.

The decorative sheet was subjected to the evaluation of glaze and the sensory evaluation. The results are shown in Table 1.

Example 2

A decorative sheet was obtained in the same manner as in Example 1 except that 8% by mass of silica particles having an average particle diameter of 3.5 μm were mixed in the thermosetting resin composition for forming the second surface protective layer. The results obtained in the same manner as in Example 1 are shown in Table 1.

Example 3

A decorative sheet was obtained in the same manner as in Example 1 except that 16% by mass of silica particles having an average particle diameter of 3.5 μm were mixed in the thermosetting resin composition for forming the second surface protective layer. The results obtained by evaluating in the same manner as in Example 1 are shown in Table 1.

Comparative Examples 1 to 3

Decorative sheets were obtained in the same manner as in Examples 1 to 3 except that the urethane acrylic resin beads were not used (Comparative Example 1 corresponded to Example 1, Comparative Example 2 corresponded to Example 2, and Comparative Example 3 corresponded to Example 3). The results obtained by evaluating in the same manner as in Example 1 are shown in Table 1.

TABLE 1

| | | Example 1 | Example 2 | Example 3 | Comparative Example 1 | Comparative Example 2 | Comparative Example 3 |
|---|---|---|---|---|---|---|---|
| Glossiness of region of second surface protective layer 8 | 20 degrees | 1.8 | 0.8 | 0.7 | 3.4 | 0.8 | 0.7 |
| | 60 degrees | 11.9 | 3.5 | 2.0 | 22.6 | 3.9 | 2.4 |
| | 85 degrees | 20.5 | 6.1 | 6.1 | 48.1 | 11.5 | 9.0 |
| Glossiness of region of first surface protective layer exposed 9 | 20 degrees | 0.7 | 0.7 | 0.7 | 0.7 | 0.7 | 0.7 |
| | 60 degrees | 1.4 | 1.4 | 1.4 | 1.4 | 1.4 | 1.4 |
| | 85 degrees | 13.5 | 13.5 | 13.5 | 13.5 | 13.5 | 13.5 |
| Hand feeling | | strong resistance | strong resistance | strong resistance | weak resistance | weak resistance | weak resistance |

The decorative sheets of the present invention are excellent owing to excellent in hand feeling and presence of wood surface texture. In Example 1 and Comparative Example 1, the second surface protective layer has a high glossiness at all the angles. It is considered that this is because only the first surface protective layer contains silica as a matte agent.

In Examples 2 and 3 and Comparative Examples 2 and 3, on the other hand, the magnitude relationship of glossiness is inverted at an angle of 85 degrees. Specifically, the second surface protective layer has a higher or equivalent glossiness at an angle up to about 80 degrees, but the second surface protective layer exhibits a lower glossiness upon exceeding the angle. This is because of the effect of the matte agent contained in the second surface protective layer.

The inversion of glossiness exhibits a large extent of inversion in Examples 2 and 3 containing the synthetic resin beads. Specifically, at an angle of 85 degrees, the difference in glossiness is 2.0 in Comparative Example 2, whereas the difference in glossiness is 7.4 in Example 2, which is three times or more. The difference in glossiness is 4.5 in Comparative Example 3, whereas it is largely improved as 7.4 in Example 3.

As described above, the decorative sheet of the present invention effectively generates change of the difference in glaze due to the viewing angle, and can control the same, thereby attaining delicate design expression close to real wood.

INDUSTRIAL APPLICABILITY

According to the present invention, such a decorative sheet can be obtained that has a pattern formed on the surface thereof, has a difference in glaze corresponding to the pattern, in which the difference in glaze is visually recognized as a concave part, and has a relief appearance on the surface thereof, and in the case where the present invention is applied to a woodgrain pattern, a decorative sheet having wood surface texture can be obtained. In a woodgrain pattern, difference in glaze and relief appearance of the vessel part can be realistically expressed to provide texture and hand feeling close to a material using real wood.

The invention claimed is:

1. A decorative sheet comprising a substrate having thereon at least a pattern layer, a homogeneous and uniform first surface protective layer covering the whole surface of the pattern layer, and a second surface protective layer discontinuously provided on the first surface protective layer, the first surface protective layer and the second surface protective layer each containing a curable resin composition having been crosslinked and cured, the first surface protective layer containing a matte agent, the second surface protective layer containing synthetic resin beads having an average particle diameter of from 10 to 30 μm, the synthetic resin beads protruding from a surface of the second surface protective layer that is opposite from a surface of the second surface protective layer that is facing the first surface protective layer, wherein the second surface protective layer is a resin layer, a region of the second surface protective layer and a region of the first surface protective layer, exposed through the second surface protective layer, having a difference in glaze, and the difference in glaze being conformed to a pattern of the pattern layer, and wherein the second surface protective layer has a thickness in a range of 3 to 10 μm.

2. The decorative sheet as described in claim 1, wherein the second surface protective layer further contains a matte agent.

3. The decorative sheet as described in claim 1, wherein the synthetic resin beads are acrylic resin beads.

4. The decorative sheet as described in claim 1, wherein the curable resin compositions in the first surface protective layer and in the second surface protective layer are a thermosetting resin composition.

5. The decorative sheet as described in claim 1, wherein the curable resin compositions in the first surface protective layer and in the second surface protective layer are an ionizing radiation curable resin composition.

6. The decorative sheet as described in claim 5, wherein the ionizing radiation curable resin composition is an electron beam curable resin composition.

7. The decorative sheet as described in claim 1, wherein the pattern layer has a woodgrain pattern, and a vessel part of the woodgrain pattern is conformed to the region of the first surface protective layer exposed through the second surface protective layer.

8. The decorative sheet as described in claim 1, wherein said curable resin compositions in the first surface protective layer and in the second surface protective layer include a polyurethane resin.

9. The decorative sheet as described in claim 1, wherein said matte agent contained in said first surface protective layer is selected from the group consisting of inorganic salts and inorganic powders, and particles of the matte agent have an average particle diameter of 0.1 to 5 μm.

10. The decorative sheet as described in claim 1, wherein said synthetic resin beads have an average particle diameter of from 15 to 25 μm.

11. The decorative sheet as described in claim 1, wherein the synthetic resin beads are contained in the second surface protective layer in the amount of from 10 to 50% by mass based on the resin composition of the second surface protective layer.

12. The decorative sheet as described in claim 2, wherein the difference in glaze between the region of the second surface protective layer and said region of the first surface protective layer, exposed through the second surface protective layer, changes depending upon viewing angle of the decorative sheet.

* * * * *